(12) United States Patent
Wu et al.

(10) Patent No.: US 11,353,998 B2
(45) Date of Patent: Jun. 7, 2022

(54) TOUCH PANEL AND MANUFACTURING METHOD THEREOF

(71) Applicant: TPK Advanced Solutions Inc., Fujian (CN)

(72) Inventors: Shan-Yu Wu, New Taipei (TW); Chih-Min Chen, New Taipei (TW)

(73) Assignee: TPK Advanced Solutions Inc., Fujian (CN)

( * ) Notice: Subject to any disclaimer, the term of this patent is extended or adjusted under 35 U.S.C. 154(b) by 0 days.

(21) Appl. No.: 17/096,080

(22) Filed: Nov. 12, 2020

(65) Prior Publication Data

US 2021/0200378 A1  Jul. 1, 2021

(30) Foreign Application Priority Data

Dec. 31, 2019  (CN) .......................... 201911413766.1

(51) Int. Cl.
*G06F 3/044* (2006.01)
*G06F 3/041* (2006.01)

(52) U.S. Cl.
CPC .......... *G06F 3/0443* (2019.05); *G06F 3/0412* (2013.01); *G06F 2203/04103* (2013.01)

(58) Field of Classification Search
None
See application file for complete search history.

(56) References Cited

U.S. PATENT DOCUMENTS

| | | | |
|---|---|---|---|
| 2013/0241857 A1* | 9/2013 | Chung | G06F 3/0443 345/173 |
| 2014/0285737 A1* | 9/2014 | Takahashi | B29C 59/002 349/12 |
| 2015/0009422 A1* | 1/2015 | Tung | G06F 3/0446 349/12 |
| 2016/0246415 A1* | 8/2016 | Bae | G06F 3/0443 |
| 2019/0384429 A1 | 12/2019 | Hsiao et al. | |
| 2020/0301557 A1* | 9/2020 | Hsiao | G06F 3/047 |
| 2021/0157448 A1* | 5/2021 | Tsai | G06F 3/0443 |

FOREIGN PATENT DOCUMENTS

| | | |
|---|---|---|
| TW | I641976 B | 11/2018 |
| TW | M586818 U | 11/2019 |
| TW | M588281 U | 12/2019 |

* cited by examiner

*Primary Examiner* — Duane N Taylor, Jr.
(74) *Attorney, Agent, or Firm* — Cooper Legal Group, LLC

(57) ABSTRACT

A touch panel has a substrate having a display region and a peripheral region, a touch sensing electrode disposed in the display region of the substrate, and a peripheral circuit disposed in the peripheral region of the substrate. The touch sensing electrode is electrically connected to the peripheral circuit, and the touch sensing electrode layer includes a first portion of a patterned metal nanowire layer. The peripheral circuit includes a patterned conductive layer and a second portion of the metal nanowire layer. At least a non-conductive material of the conductive layer is between the peripheral circuit and a second peripheral circuit.

20 Claims, 10 Drawing Sheets

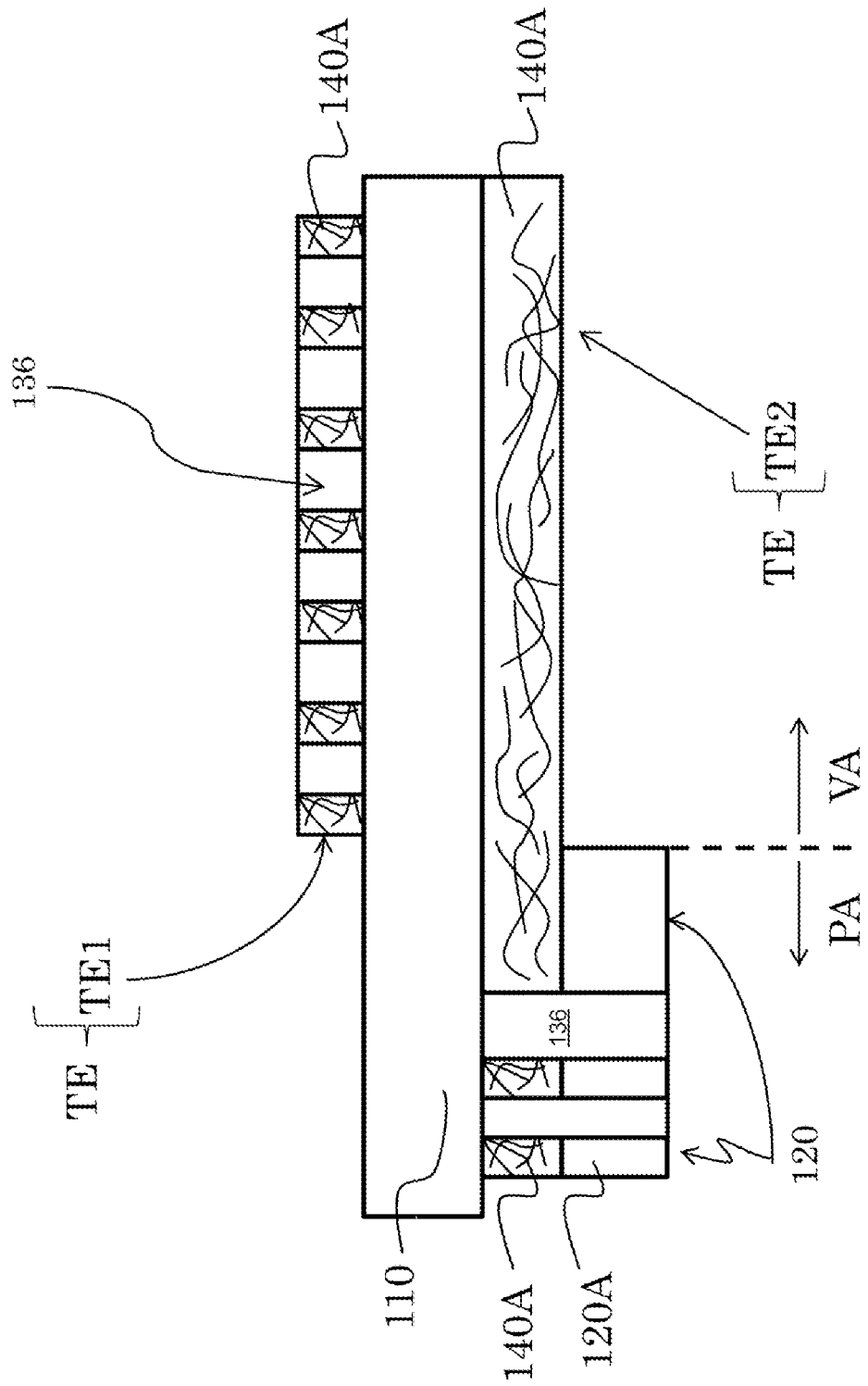

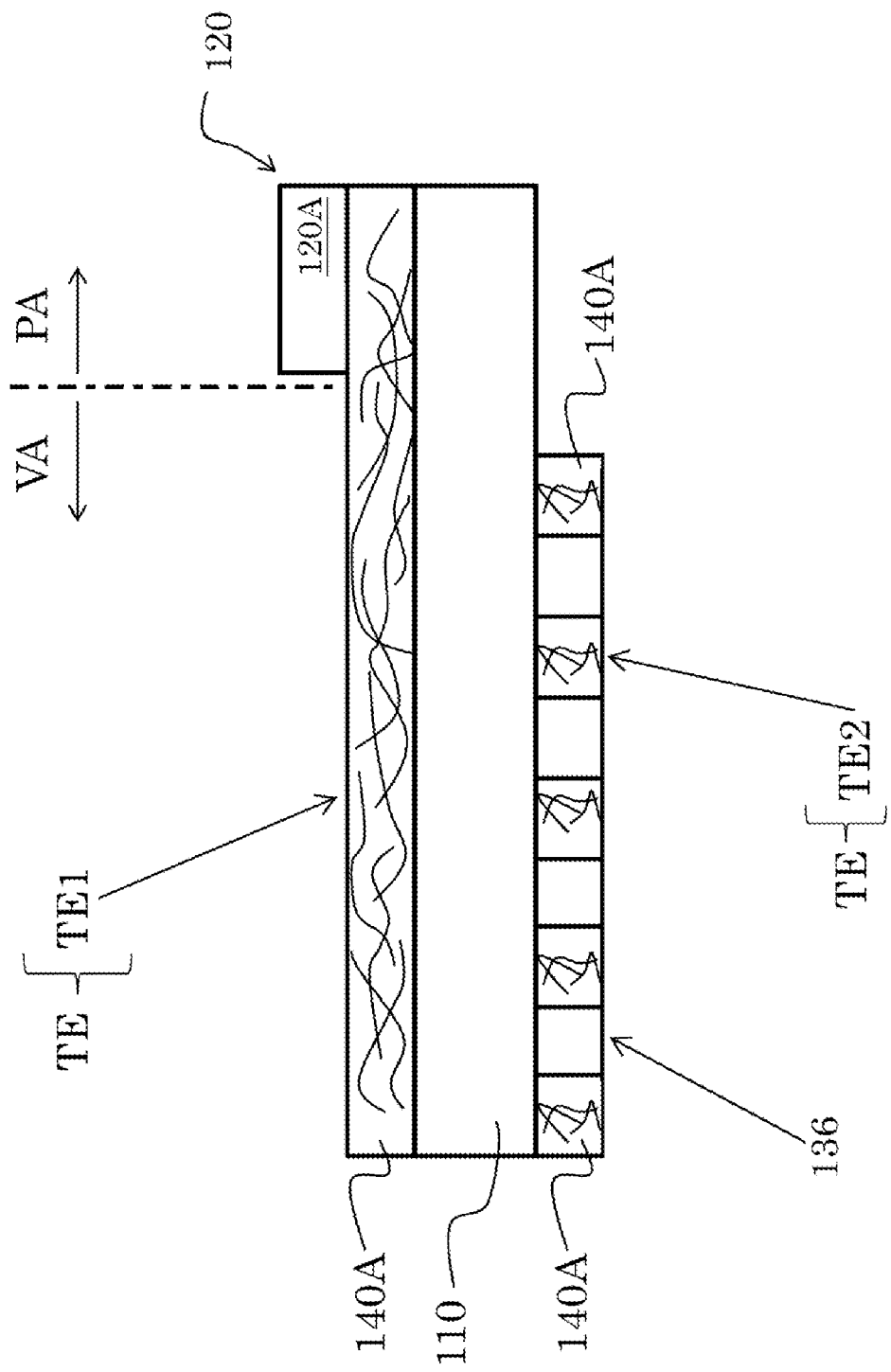

TOUCH PANEL AND MANUFACTURING METHOD THEREOF

CROSS-REFERENCE TO RELATED APPLICATION

This application claims priority to China Application Serial Number 201911413766.1, filed Dec. 31, 2019, which is herein incorporated by reference.

BACKGROUND

Field of Disclosure

The present disclosure relates to a touch panel and a manufacturing method thereof.

Description of Related Art

Since transparent conductors have both light transmissivity and proper conductivity, they can be applied to display panel or touch panel related devices. Generally speaking, transparent conductors can be various metal oxides, such as indium tin oxide (ITO), indium zinc oxide (IZO), cadmium tin oxide (CTO), or aluminum-doped zinc oxide (AZO). However, certain characteristics of these metal oxide films have made using these metal oxide films challenging, such as insufficient flexibility. In some cases, patterned metal oxide films may also be problematic because the patterned metal oxide films are easily observed by users. Therefore, a variety of transparent conductors have been developed today, for example, transparent conductors made of materials such as nanowires.

However, when using nanowires for manufacturing touch electrodes, there are many problems to be solved in the process and structure of nanowires and metal leads in the peripheral region. For example, laser processing is used in the traditional process to produce patterns, but laser equipment is costly. Due to the trend toward narrow bezels and thinning substrates, the control on laser equipment mechanism must be precise, otherwise, it is disadvantageous to mass production of narrow bezel products that require fine circuits.

Further, in a process of manufacturing touch sensing electrodes using a laser, the laser will remove the material in the etched area. Also, when a substrate is irradiated with laser, the problem of point-like damage on the substrate may easily occur.

Therefore, in the process of manufacturing touch sensing electrodes using nanowire, the electrode structure must be redesigned according to the material characteristics, such that the product can have better performance.

SUMMARY

According to some embodiments of the present disclosure, a method of manufacturing a touch panel for addressing the foregoing issues is provided. The method has high manufacturing efficiency and process advantages in an application in fine circuits of narrow bezel products.

According to some embodiments of the present disclosure, a touch panel is provided. The touch panel comprises a substrate having a display region and a peripheral region; a touch sensing electrode disposed in the display region of the substrate; and a peripheral circuit disposed in the peripheral region of the substrate, in which the touch sensing electrode is electrically connected to the peripheral circuit. The touch sensing electrode comprises a first portion of a metal nanowire layer that is patterned. The peripheral circuit comprises a conductive layer and a second portion of the metal nanowire layer that are patterned. The conductive layer comprises conductive filler particles and a non-conductive material. The non-conductive material in the conductive layer is between the peripheral circuit and a second peripheral circuit. In one etching step, the non-conductive material in the conductive layer remains due to etching selectivity to form an isolation structure between adjacent peripheral circuits (i.e., between the peripheral circuit and the second peripheral circuit).

In some embodiments of the present disclosure, the touch panel further comprises an overcoat disposed on the metal nanowire layer.

In some embodiments of the present disclosure, a non-conductive region is between the peripheral circuit and the second peripheral circuit, and the non-conductive material in the conductive layer and the overcoat are disposed in the non-conductive region. In one etching step, due to etching selectivity, the non-conductive material in the conductive layer and the overcoat remain to form an isolation structure between the adjacent peripheral circuits.

In some embodiments of the present disclosure, the conductive layer is formed by curing a conductive slurry comprising the conductive filler particles and the non-conductive material.

In some embodiments of the present disclosure, with respect to the peripheral circuit, the second portion of the metal nanowire layer is between the conductive layer and the substrate, or the conductive layer is between the second portion of the metal nanowire layer and the substrate.

In some embodiments of the present disclosure, the touch sensing electrode comprises a first touch sensing electrode disposed at an upper surface of the substrate and a second touch sensing electrode disposed at a lower surface of the substrate.

According to some embodiments of the present disclosure, a method of manufacturing a touch panel is provided. The method comprises providing a substrate having a display region and a peripheral region; disposing a metal nanowire layer comprising metal nanowires and disposing a conductive layer on the substrate, in which a first portion of the metal nanowire layer is disposed in the display region, a second portion of the metal nanowire layer is disposed in the peripheral region, and the conductive layer is disposed in the peripheral region and comprises conductive filler particles and a non-conductive material; and performing a patterning step, comprising patterning the first portion of the metal nanowire layer disposed in the display region to form a touch sensing electrode and concurrently patterning the conductive layer and the second portion of the metal nanowire layer disposed in the peripheral region to form a peripheral circuit, in which at least the non-conductive material of the conductive layer that is not removed during the pattern step is between the peripheral circuit and a second peripheral circuit.

In some embodiments of the present disclosure, disposing the conductive layer on the substrate comprises coating a conductive slurry comprising the conductive filler particles and the non-conductive material on the substrate and then curing.

In some embodiments of the present disclosure, performing the patterning step comprises concurrently applying an etching liquid on the conductive layer and the metal nanowire layer, in which an etching rate ratio of the etching liquid for the conductive filler particles to the non-conductive material is at least 10.

In some embodiments of the present disclosure, the etching liquid comprises 0.01 wt % to 80 wt % of a metal etchant and a solvent of 20 wt % to 99.9 wt % of a solvent.

According to some embodiments of the present disclosure, the metal etchant comprises (1) hypochlorous acid, permanganic acid, perchloric acid, dichromic acid, salts of at least one of the hypochlorous acid, the permanganic acid, or the dichromic acid, or a combination thereof; (2) metal-containing salts; and (3) peroxides, a mixture of peroxides and acids, or a mixture of peroxides and chelating agents.

According to some embodiments of the present disclosure, the etching liquid further comprises 0.1 wt % to 20 wt % of an additive.

According to some embodiments of the present disclosure, disposing the metal nanowire layer comprising the metal nanowires and disposing the conductive layer on the substrate comprises disposing the metal nanowire layer on the substrate; disposing the conductive layer on the metal nanowire layer; and removing the conductive layer on the display region.

In some embodiments of the present disclosure, disposing the metal nanowire layer comprising the metal nanowires and disposing the conductive layer on the substrate comprises: disposing the metal nanowire layer on the substrate; coating a conductive slurry comprising the conductive filler particles and the non-conductive material on the metal nanowire layer in the peripheral region; and curing the conductive slurry to form the conductive layer.

In some embodiments of the present disclosure, disposing the metal nanowire layer comprising the metal nanowires and disposing the conductive layer on the substrate comprises: coating a conductive slurry comprising the conductive filler particles and the non-conductive material on the substrate in the peripheral region; curing the conductive slurry to form the conductive layer; and disposing the metal nanowire layer on the conductive layer and the substrate.

In some embodiments of the present disclosure, the method further comprises disposing an overcoat on the metal nanowire layer.

In some embodiments of the present disclosure, a non-conductive region is between the peripheral circuit and the second peripheral circuit, and the non-conductive material in the conductive layer and the overcoat disposed in the non-conductive region are not removed during the patterning step.

In some embodiments of the present disclosure, a non-conductive region is between the touch sensing electrode and a second touch sensing electrode, and the overcoat disposed in the non-conductive region is not removed during the patterning step.

BRIEF DESCRIPTION OF THE DRAWINGS

FIG. 5A is a sectional schematic view along line A-A in FIG. 5.

FIG. 5B is a sectional schematic view along line B-B in FIG. 5.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the drawings, some of the conventional structures and elements are shown with schematic illustrations.

As used herein, "around", "about", or "approximately" shall generally mean within 20 percent, preferably within 10 percent, and more preferably within 5 percent of a given value or range. Numerical quantities given herein are approximate, meaning that the term "around", "about", or "approximately" can be inferred if not expressly stated. In addition, it is noted that the terms "pattern", "image", and "configuration" used in the present disclosure all have the same or similar meanings and may be used interchangeably for convenience of explanation.

Figure 1:
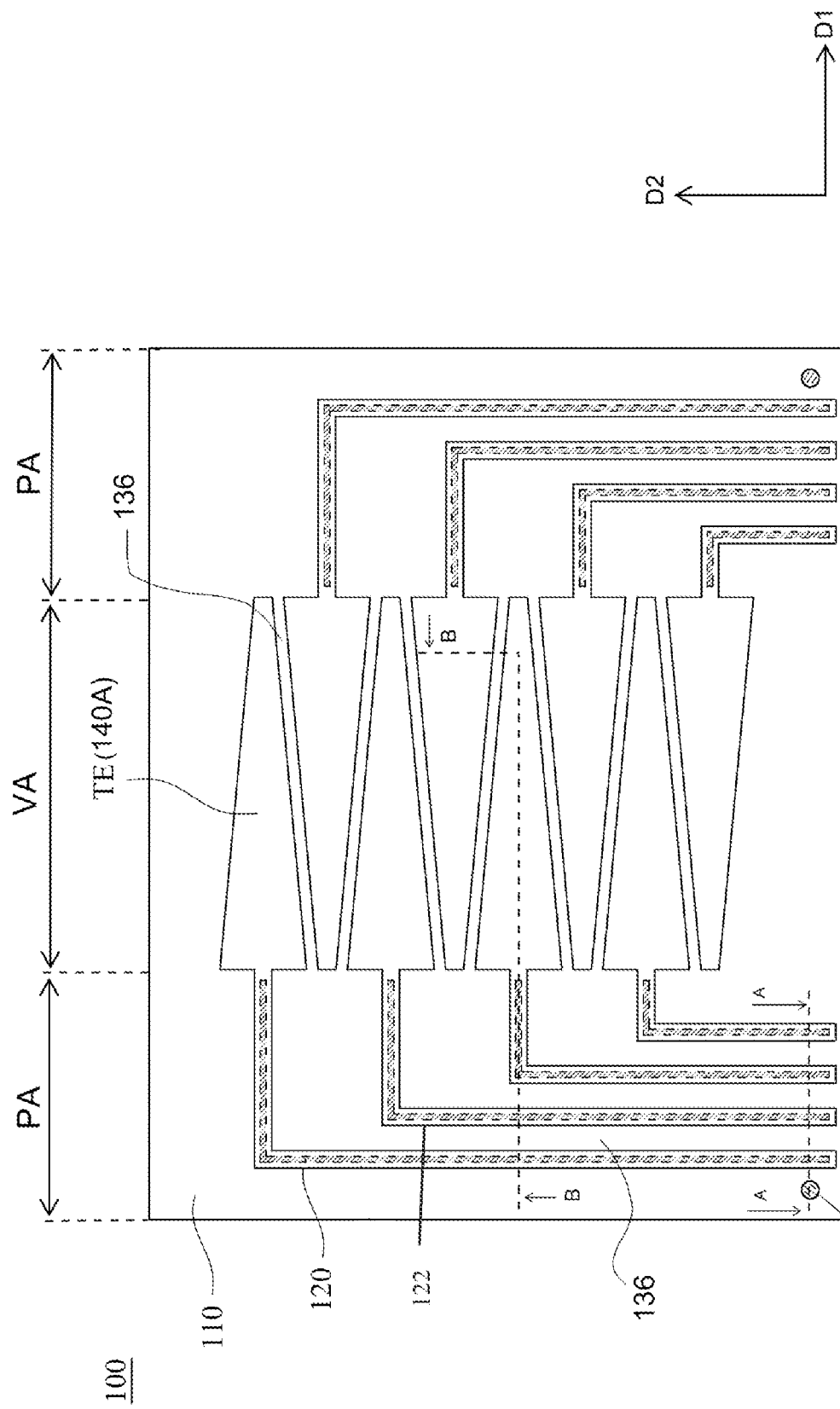
FIG. 1 is a schematic view of a touch panel according to some embodiments of the present disclosure.

Examples of the present disclosure provide a touch panel 100 comprising a substrate 110, a peripheral circuit 120 comprising a conductive layer 120A and a metal nanowire layer 140A, and a touch sensing electrode TE comprising the metal nanowire layer 140A. FIG. 1 is a schematic top view of the touch panel 100 according to some embodiments of the present disclosure. The touch panel 100 in FIG. 1 comprises the substrate 110, the peripheral circuit 120, and the touch sensing electrode TE. The number of peripheral circuits 120 and touch sensing electrodes TE may be one or more, and the numbers drawn in the following specific examples and drawings are merely for illustrative purposes and do not limit the present disclosure. For example, in FIG. 1, 8 peripheral circuits are illustrated, including the peripheral circuit 120, the second peripheral circuit 122, etc.

The method of manufacturing the touch panel 100 in the present embodiment comprises providing the substrate 110, disposing the metal nanowire layer 140A comprising the metal nanowires 140 on the substrate 110, disposing the conductive layer 120A on the substrate 110, and performing a patterning step to form the touch sensing electrode TE and concurrently form the peripheral circuit 120.

Referring to FIG. 1, the substrate 110 may have a display region VA and a peripheral region PA. The peripheral region PA is disposed on the side of the display region VA. For example, the peripheral region PA may be disposed around a frame-shaped region of the display region VA (namely encompassing right side, left side, upper side, and lower side). However, in other examples, the peripheral region PA is an L-shaped region located on the left side and lower side of the display region VA. As shown in FIG. 1, in the present example, a total of eight sets of the peripheral circuits 120 are disposed at the peripheral region PA of the substrate 110, and the touch sensing electrode TE is disposed at the display region VA of the substrate 110. In the present example, by means of a one-step etching process, the metal nanowire layer 140A and the conductive layer 120A in the peripheral region PA are concurrently patterned to form the peripheral circuit 120. Therefore, the material of the upper layer (e.g., the conductive layer 120A) and the lower layer (e.g., the metal nanowire layer 140A) can be patterned at a predetermined position without aligning, such that the needs of providing an alignment error region in the manufacturing process is reduced or avoided, thereby reducing the width of the peripheral region PA and further fulfilling the requirement of a narrow bezel of the display device and avoiding the problem of lower process yield caused by patterning errors caused by multiple alignments. In addition, the one-step etching in the present example may only remove the conductive material in the metal nanowire layer 140A and the conductive layer 120A, leaving the non-conductive material remaining in the structure.

The method of manufacturing touch panel 100 in the present embodiment comprises providing the substrate 110, disposing the metal nanowire layer 140A comprising the metal nanowires 140 on the substrate 110, disposing the conductive layer 120A on the metal nanowire layer 140A, and performing a patterning step to form the touch sensing electrode TE and concurrently form the peripheral circuit 120. The implementation of the patterning step may produce a non-conductive region 136. In the non-conductive region 136, there is no conductive material, and the non-conductive material remains. The detailed process of the method of manufacturing touch panel 100 in the present embodiment is as follows. First, referring to FIG. 2, the substrate 110 is provided. In some embodiments of the present disclosure, the substrate 110 may be a transparent substrate and specifically may be a hard transparent substrate or a flexible transparent substrate, where the material can be selected from glass, acrylic polymethylmethacrylate (PMMA), polyvinyl chloride (PVC), polypropylene (PP), polyethylene terephthalate (PET), polyethylene naphthalate (PEN), polycarbonate (PC), polystyrene (PS), cyclo olefin polymer (COP), colorless polyimide (CPI), and other transparent materials.

Figure 2:
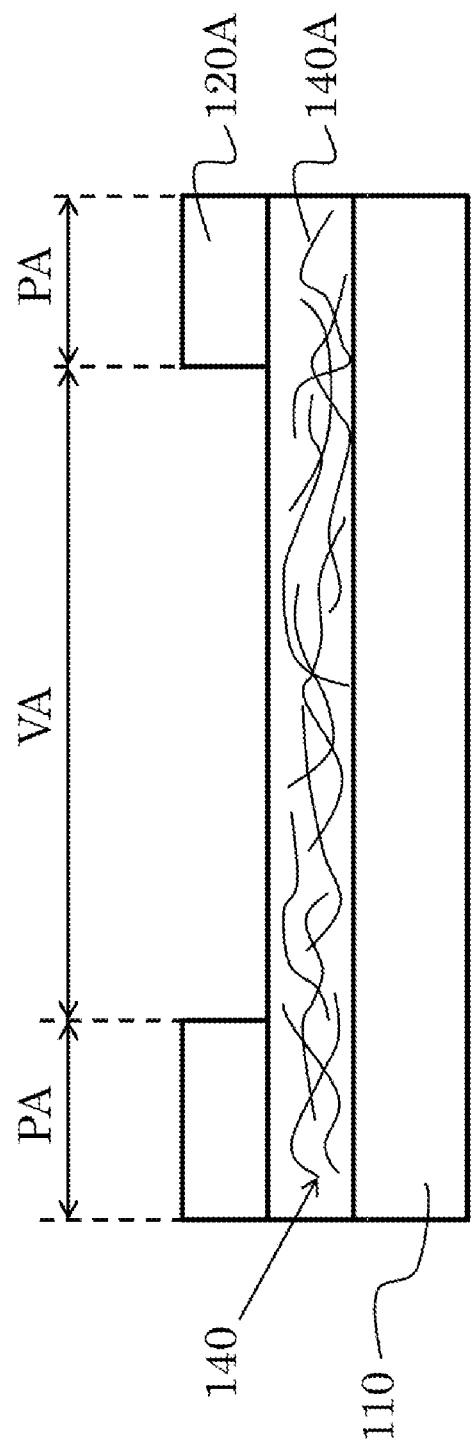
FIG. 2 is a schematic view of manufacturing a metal nanowire layer and a conductive layer on a substrate according to some embodiments of the present disclosure.

Next, still referring to FIG. 2, the metal nanowire layer 140A and the conductive layer 120A are fabricated on the substrate 110. The metal nanowire layer 140A may comprise the metal nanowires 140, as shown in FIG. 2, and the metal nanowire layer 140A is located between the conductive layer 120A and the substrate 110.

The detailed forming method of the metal nanowire layer 140A in the present example is as follows. A dispersion or ink comprising the metal nanowires 140 is formed on the substrate 110 by a coating method and is then dried, such that the metal nanowires 140 cover the surface of the substrate 110. In other words, the metal nanowires 140 may form as the metal nanowire layer 140A disposed on the substrate 110 due to the drying and curing steps. The display region VA and the peripheral region PA may be defined on the substrate 110, as shown in FIG. 1. The peripheral region PA is disposed on the side of the display region VA. For example, the peripheral region PA is disposed on the region at the left side and right side of the display region VA. However, in other examples, the peripheral region PA may be disposed around a frame-shaped region of the display region VA (namely encompassing right side, left side, upper side, and lower side), or is disposed in an L-shaped region at adjacent sides of the display region VA. The metal nanowire layer 140A may comprise a first portion formed in the display region VA and a second portion formed in the peripheral region PA. In detail, in the display region VA, the first portion of the metal nanowire layer 140A may be directly formed on a surface of the substrate 110. While in the peripheral region PA, the second portion of the metal nanowire layer 140A may be directly formed on a surface of the substrate 110.

In examples of the present disclosure, the dispersion comprising the metal nanowires 140 may be a solvent, such as water, alcohols, ketones, ethers, hydrocarbons, or an aromatic solvent (such as benzene, toluene, and xylene, but the disclosure is not limited thereto). The dispersion may also comprise an additive, a surfactant, or an adhesive, such as carboxymethyl cellulose (CMC), hydroxyethyl cellulose (HEC), hydroxypropyl methylcellulose (HPMC), sulfonate ester, sulfate ester, disulfonate salts, sulfosuccinic acid ester, phosphate ester, a fluorine-containing surfactant, etc. The metal nanowire layer may comprise, for example, a silver nanowire layer, a gold nanowire layer, or a copper nanowire layer. More specifically, the term "metal nanowire(s)" in the present disclosure is a collective noun that refers to a set of metal wires comprising a plurality of elemental metals, metal alloys, or metal compounds (including metal oxides). The number of metal nanowires does not limit the scope of the present disclosure. A dimension of at least one cross-sectional area of the metal nanowires (i.e., the diameter of the cross-sectional area) is below 500 nm, below 100 nm, or below 50 nm. The so-called "wire(s)" of the metal nanostructure in the present disclosure has a high aspect ratio, such as 10 to 100,000. Specifically, the aspect ratio (i.e., the ratio of the length to the diameter of the cross-sectional area) of the metal nanowires may be 10 and above, preferably 50 and above or more preferably 100 and above. The metal nanowires may be any metals, including but not limited to silver, gold, copper, nickel, and a silver material coated with gold. Other terms such as "silk," "fiber," or "tube" having a dimension and an aspect ratio within the aforementioned value ranges are also included in the scope of the present disclosure.

The dispersion or ink comprising the metal nanowires 140 may be formed on a surface of the substrate 110 by a suitable process known in the art, including but not limited to a screen printing process, a spray coating process, or a roller coating process. In one example, the dispersion or ink comprising the metal nanowires 140 may be coated on the surface of the substrate 110 in continuous supply. After the curing/drying step, the solvent or the like is evaporated, and the metal nanowires 140 are distributed on the surface of the substrate 110 randomly. Preferably, the metal nanowires 140 are fixed on the surface of the substrate 110 without peeling, such that the metal nanowire layer 140A is formed, and the metal nanowires 140 may be in contact with each other to provide a continuous electrical current pathway, thereby forming a conductive network.

In some embodiments of the present disclosure, the metal nanowires 140 may be silver nanowires or silver nanofibers, which may have an average diameter of about 20 to 100 nanometers and an average length of 20 to 100 micrometers. Preferably, the average diameter is about 20 to 70 nanometers and the average length is about 20 to 70 micrometers, namely, the aspect ratio is 1000. In some embodiments, the diameter of the metal nanowires 140 may be between 70 nanometers to 80 nanometers, and the length may be about 8 micrometers.

The detailed method of forming the conductive layer 120A in the present example is as follows. A metal material is formed on the metal nanowire layer 140A by an appropriate process, such as but not limited to, coating a metal conductive slurry, for example, a silver paste (Ag paste) material on the metal nanowire layer 140A. In one example, the conductive layer 120A may be disposed on the metal nanowire layer 140A, and the conductive layer 120A is only disposed at the peripheral region PA. The specific method may be but is not limited to coating the silver paste material on the metal nanowire layer 140A and at the peripheral region PA, followed by curing the silver paste material to form the conductive layer 120A. In one specific example, the temperature in the curing step of the silver paste material is about 90° C.-110° C., and the curing time is about 10-20 minutes. The metal conductive slurry may be selected to be an ultraviolet (UV) hardening type conductive silver paste. The hardening mechanism is that after a photosensitive resin in the composition of the metal conductive material is exposed to high-energy radiation such as ultraviolet light, electron beam, X-ray, etc., some chemical or physical changes such as bridging, crosslinking, decomposition, or isomerization occur, which in turn change the properties of the photosensitive resin. A suitable amount of photoinitiator and photosensitizer may be added to the UV hardening type conductive silver paste to achieve the purpose of photo-initiated polymerization. In one example, the curing method of the metal conductive slurry may be thermal curing, room temperature curing (e.g., curing at 20-25° C.), curing by a surface treatment agent, etc.

The metal conductive slurry in the present example is a composite material made by using a resin matrix as a binder, a conductive filler material (such as powder of gold, silver, copper, aluminum, zinc, iron, or nickel, graphite, or some conductive compound filler particles), solvent, etc. The resin matrix can use a variety of binder/adhesive-type resin matrix. Commonly used thermosetting adhesives are, for example, epoxy resin, organosilicone resin, polyimide resin, phenolic resin, polyurethane, acrylic resin, and other adhesive systems. The content of the resin matrix accounts for more than 80 wt %, the content of the conductive filler particles is about 5-50 wt %, and the content of the solvent is about 1-10 wt %. The metal conductive slurry may also comprise auxiliaries, cross-linking agents, coupling agents, diluents, preservatives, toughening agents, thixotropic agents, etc. After the metal conductive slurry is cured, the solvent evaporates, and the resin matrix forms the main structure, which mainly provides mechanical properties and/or adhesion performance, and the conductive filler particles form a conductive path. In one example, the cured metal conductive slurry constitutes the conductive layer 120A, and the conductive layer 120A may be roughly divided into conductive materials (such as the conductive filler particles) and non-conductive material (such as the resin matrix) based on their conductivity. After the patterning step described later, the conductive material in the etched region is removed, and the non-conductive material in the etched region is not removed.

For another example, the metal conductive slurry may be formed on the metal nanowire layer 140A and is between the display region VA and the peripheral region PA. Similar to the metal nanowire layer 140A, the conductive layer 120A may comprise a first portion formed in the display region VA and a second portion formed in the peripheral region PA. The first portion of the conductive layer 120A is removed in the subsequent process to expose the first portion of the metal nanowire layer 140A. The second portion of the conductive layer 120A and the second portion of the metal nanowire layer 140A are patterned in the subsequent process to form the peripheral circuit 120.

In one example, the resin matrix in the metal conductive slurry may penetrate into the gap between metal nanowires during the process due to a fluidity of the resin matrix, thereby forming part of the structure of the metal nanowire layer 140A.

Next, a patterning step is performed mainly for patterning the metal nanowire layer 140A in the display region VA to form the touch sensing electrode TE, as well as concurrently patterning the conductive layer 120A and the metal nanowire layer 140A in the peripheral region PA to form the peripheral circuit 120.

The present example may specifically include the following steps. First, a photosensitive material (such as photoresist) is exposed/developed (that is, the well-known yellow-light photolithography process) to define the pattern of the touch sensing electrode TE in the display region VA and the pattern of the peripheral circuit 120 in the peripheral region PA. Next, an etching process is performed to produce the touch sensing electrode TE comprising the metal nanowire layer 140A (namely, the first portion of the metal nanowire layer 140A) on the display region VA (see FIG. 1 and FIG. 3B), and also produce the peripheral circuit 120 comprising the metal nanowire layer 140A (namely, the second portion of the metal nanowire layer 140A) and the conductive layer 120A (namely, the second portion of the conductive layer 120A) on the peripheral region PA (see FIG. 1, FIG. 3A, and FIG. 3B).

In one example, an etching liquid that can simultaneously etch the metal nanowire layer 140A and the conductive layer 120A is used, such that the touch sensing electrode TE and the peripheral circuit 120 are manufactured in the same process. Therefore, the connection of the touch sensing electrode TE in the display region VA and the peripheral circuit 120 in the peripheral region PA is able to be completed with a minimum number of alignments (e.g. one time), thereby avoiding the low yield caused by the traditional multiple alignment processes and also omitting the alignment tolerance that is required to be reserved for an alignment process, such that the width of the peripheral circuit 120 can become as small as possible to meet the narrow bezel requirement of the display device. In addition, the selected etching liquid has a high etching selectivity between the conductive material and the non-conductive material. For example, the etching rate ratio between the conductive material and the non-conductive material is about 10 and above, 50 and above, between 100-500, or 1000 and above.

According to one specific example, in the case where the metal nanowire layer 140A is a silver nanolayer and the conductive layer 120A is a silver paste layer, an etching liquid that can etch copper and silver is used. For example, the composition of the etching liquid comprises about 0.01 wt %-80 wt % of metal etchant, about 20 wt %-99.9 wt % of solvent, and/or about 0.1 wt %-20 wt % of additive. The metal etchant may comprise but is not limited to (1) hypochlorous acid, permanganic acid, perchloric acid, dichromic acid, etc., salts of the foregoing acids, and/or a combination thereof; (2) metal-containing salts, such as salts of divalent copper and trivalent iron; and (3) peroxides, a mixture of peroxides and acids, and/or a mixture of peroxides and chelating agents. The solvent may comprise but is not limited to water and/or an organic substance. The organic substance may be 3-5 carbon-based monoalcohols or polyalcohols, such as methanol, ethanol, isopropanol, ethylene glycol, propylene glycol and glycerin, or a mixture thereof. The additive may comprise but is not limited to one or more of surfactant, defoamer, pH regulator, and inhibitor.

The surfactant may comprise but is not limited to one or more of cationic surfactant, anionic surfactant, zwitterionic surfactant, and nonionic surfactant.

The pH regulator may comprise, but is not limited to, inorganic acids, organic acids, and/or mixtures of inorganic and organic acids. The inorganic acids may comprise, but are not limited to, one or more of sulfuric acid, nitric acid, hydrochloric acid, and phosphoric acid. The organic acids may comprise but are not limited to one or more of formic acid, acetic acid, propionic acid, oxalic acid, citric acid, lactic acid, sulfonic acid, and salicylic acid.

Figure 3A:
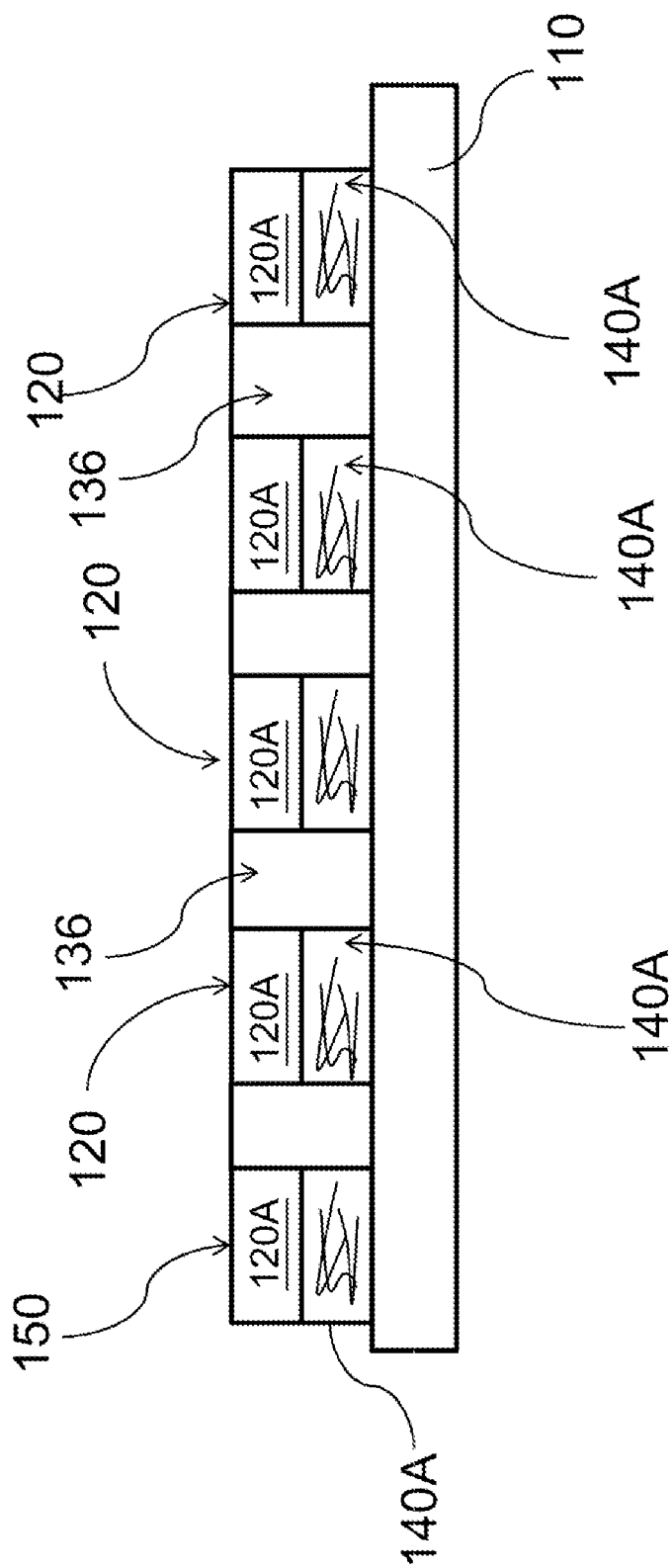
FIG. 3A is a sectional schematic view along line A-A in FIG. 1.
Figure 3B:
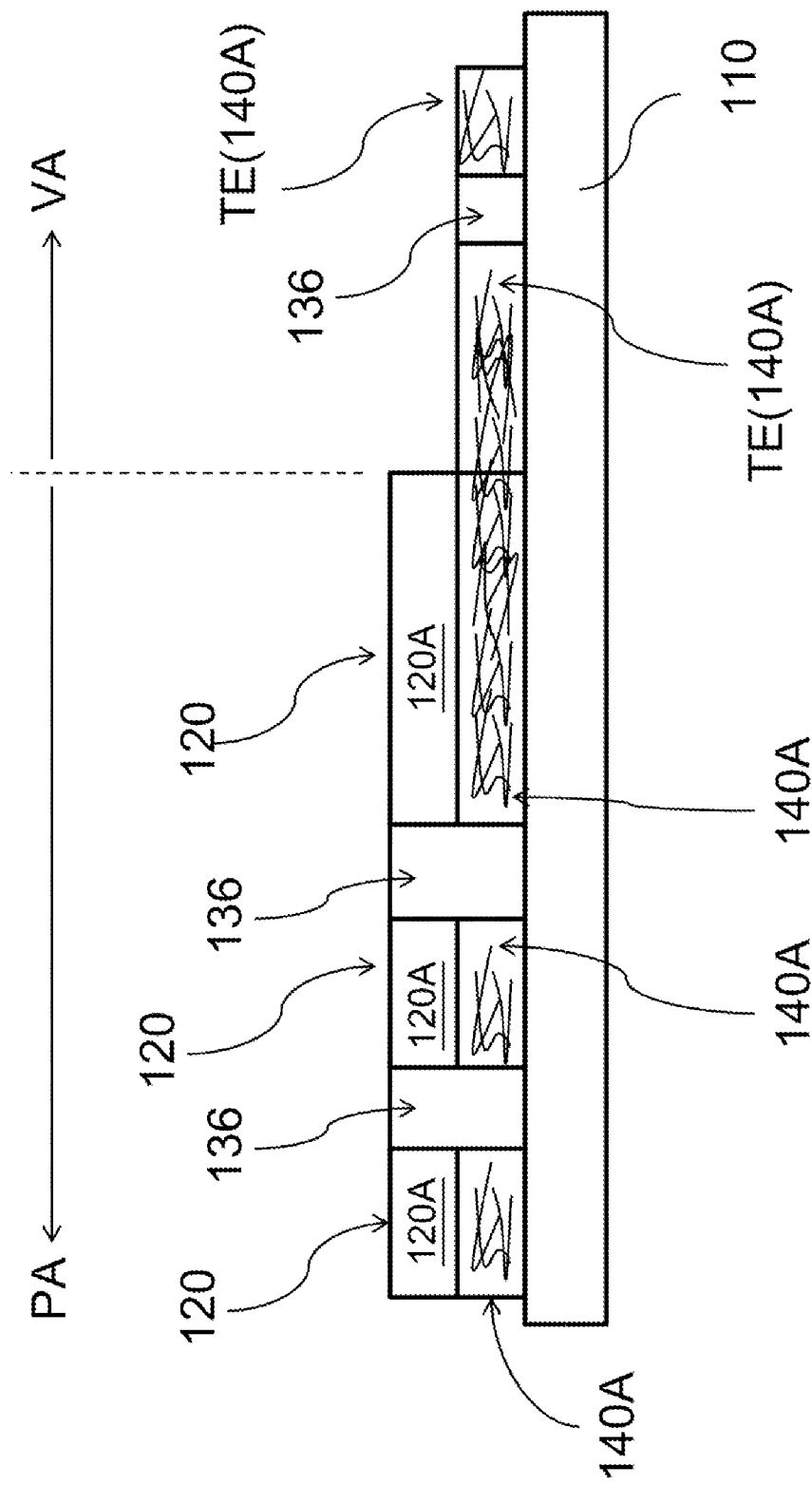
FIG. 3B is a sectional schematic view along line B-B in FIG. 1.

At this point, the touch panel 100 (such as FIG. 1) of the example in the present disclosure can be obtained, while FIG. 3A and FIG. 3B are the schematic views of cross-sections taken at line A-A and line B-B of FIG. 1. Referring to FIG. 1, FIG. 3A, and FIG. 3B, the touch panel 100 in the example of the present disclosure (as shown in FIG. 1), which is a single-sided touch panel, may comprise the substrate 110, the peripheral circuit 120 comprising the conductive layer 120A and the metal nanowire layer 140A, and the touch sensing electrode TE comprising the metal nanowire layer 140A. The touch sensing electrode TE may be electrically connected to the peripheral circuit 120.

In detail, as shown in FIG. 3A and FIG. 3B, in some embodiments of the present disclosure, the peripheral circuit 120 is a composite structure layer comprising a double-layered patterned conductive structure, which comprises the conductive layer 120A and the metal nanowire layer 140A between the conductive layer 120A and the substrate 110. The touch sensing electrode TE is formed by patterning the metal nanowire layer 140A. In other words, the metal nanowire layer 140A forms as the touch sensing electrode TE in the display region VA and forms as an underlayer structure of the peripheral circuit 120 in the peripheral region PA. Therefore, due to the conductivity of the metal nanowire layer 140A, the touch sensing electrode TE can be electrically connected with the peripheral circuit 120 for signal transmission.

As shown in FIG. 3A and FIG. 3B, in the peripheral region PA, the non-conductive region 136 is between the adjacent peripheral circuits 120 and comprises non-conductive material (such as the resin matrix) of the conductive layer 120A to electrically isolate the adjacent peripheral circuits 120 and further avoid short circuit. In other words, after the patterning step, the conductive material (such as the conductive filler particles) at a specific position in the conductive layer 120A is etched and removed. Similarly, the metal nanowires 140 at the corresponding etching position of the metal nanowire layer 140A are also etched and removed to form the non-conductive region 136. Therefore, in the present example, the non-conductive region 136 comprises the non-conductive material of the conductive layer 120A (such as the resin matrix) and the non-conductive material in the metal nanowire layer 140A and isolates adjacent peripheral circuits 120. The non-conductive material in the metal nanowire layer 140A may be a non-conductive component such as resin in the metal nanowires slurry, a non-conductive component such as the resin matrix in the metal conductive slurry overflowing to the lower layer, air, or a combination thereof. In one example, the above-mentioned etching liquid may be used to manufacture the aforementioned non-conductive region 136. Alternatively, the conductive layer 120A may be etched first, followed by etching the metal nanowire layer 140A. In one example, the conductive layer 120A and the metal nanowire layer 140A that remain after etching may have the same or similar patterns and dimensions, such as a rectangular pattern, with the same or similar widths.

As shown in FIG. 3B, in the display region VA, the non-conductive region 136 is between the adjacent touch sensing electrodes TE to electrically isolate the adjacent touch sensing electrodes TE to avoid short circuit. In other words, the non-conductive region 136 is between sidewalls of the adjacent touch sensing electrodes TE. In the present example, the non-conductive region 136 may be a gap/air gap left after etching the metal nanowires 140, the non-conductive material in the metal nanowire layer 140A that is not removed by etching, a non-conductive component such as the resin matrix in the metal conductive slurry that overflows to the lower layer, or a combination thereof, thereby isolating the adjacent touch sensing electrode TE. In one example, the aforementioned etching liquid can be used to manufacture the adjacent touch sensing electrodes TE. In the present embodiment, the touch sensing electrodes TE are disposed in a non-interlace arrangement. For example, the touch sensing electrode TE is an electrode in a rectangular shape extending along a first direction D1 without interlacing with each other. However, in other embodiments, the touch sensing electrode TE may have any appropriate shapes and the scope of the present disclosure shall not be limited. In the present embodiment, the touch sensing electrode TE adopts a single-layer configuration, in which a touch sensing position can be obtained by detecting the change of the capacitance value of each of the touch sensing electrodes TE.

In the present embodiment, the touch sensing electrode TE in the display region VA preferably has conductivity and light transmittance. Therefore, the metal nanowire layer 140A that is used to manufacture touch sensing electrode TE has preferably the following characteristics: the transmission to visible light (e.g. wavelength between about 400 nm-700 nm) is greater than about 80%, and the surface resistance is between about 10 to 1000 ohms/square. Alternatively, the transmission of the metal nanowire layer 140A to visible light (e.g. wavelength between about 400 nm-700 nm) is greater than about 85%, and the surface resistance is between about 50 to 500 ohms/square.

In one example, a mark 150 is further disposed in the peripheral region PA of the substrate 110. Referring to FIG. 1 and FIG. 3A, in the same way with the peripheral circuit 120, the mark 150 is also produced by a one-step etching of the metal nanowire layer 140A and the conductive layer 120A, and therefore the mark 150 comprises the conductive layer 120A and the metal nanowire layer 140A between the conductive layer 120A and the substrate 110. In addition, the metal nanowire layer 140A and the conductive layer 120A that form the mark 150 have the same or similar patterns and dimensions, such as circles with the same or similar radius, quadrilaterals with the same or similar side length, or other patterns with the same or similar cross shape, L shape, T shape, etc. The mark 150 can be widely interpreted as a pattern that does not have electrical functions. For example, the mark 150 can be any verification marks, patterns, or labels required in the manufacturing process, which are all protected by the present disclosure. The mark 150 may have any possible shapes, such as circle, quadrilateral, cross, L-shape, T-shape, etc., but is not limited thereto. In one example, the upper and lower two-layer structure that forms the mark 150 and the upper and lower two-layer structure of the peripheral circuit 120 have (e.g., are adjacent to) the non-conductive region 136, and the previous description may be referenced for additional details.

Figure 6:
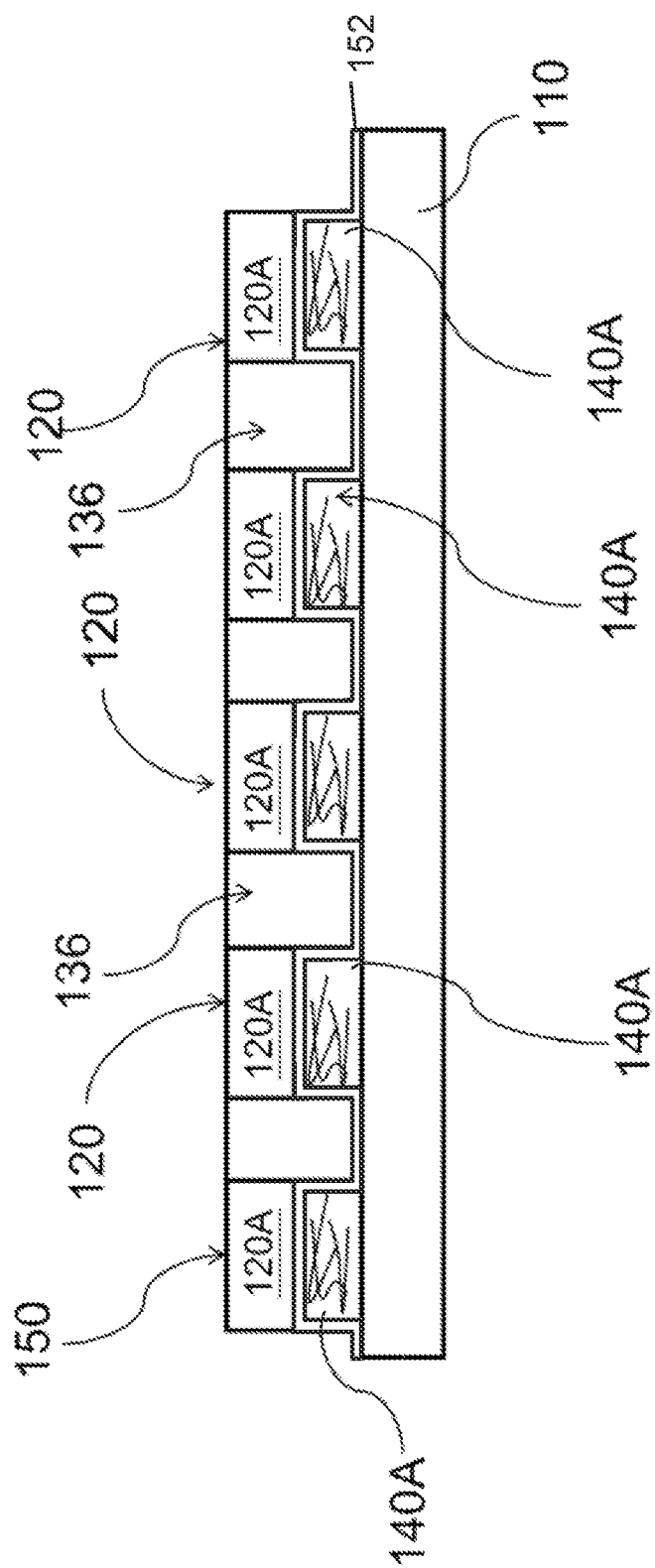
FIG. 6 is a variant example corresponding to FIG. 3A.

In one example, an overcoat may be disposed on the metal nanowire layer 140A and then cured, such that the overcoat and the metal nanowire layer 140A constitute a composite structural layer. In one example, a polymer or a mixture thereof may be formed on the metal nanowire layer 140A by coating. The polymer will penetrate between the metal nanowires 140 to form a filler, and a curing step is applied to form the overcoat or a matrix layer. In other words, the metal nanowires 140 can be regarded as being embedded in the overcoat. In one specific example, the curing step may be heating and baking (at a temperature of about 60° C. to about 150° C.) the polymer or the mixture thereof to form the overcoat on the metal nanowire layer 140A. The present disclosure does not limit the physical structure between the overcoat and the metal nanowire layer 140A. For example, the overcoat and the metal nanowire layer 140A can be a two-layer stack, or the overcoat and the metal nanowire layer 140A can combine with each other to form a composite layer. In the following description, the metal nanowires 140 is embedded in the overcoat to form a composite layer, and the composite layer is patterned in the subsequent process. As one example, FIG. 6 illustrates an embodiment in which an overcoat 152 is disposed over the metal nanowire layer 140A.

In an implementation structure with the overcoat, the aforementioned etching liquid has a high etching selectivity ratio between the metal nanowires and the overcoat material. For example, the ratio of the etching rate for metal nanowires to the etching rate for the overcoat material is about 10 and above, or 50 and above, or between 100-500. Therefore, the non-conductive region 136 manufactured by etching in the peripheral region PA comprises the non-conductive material of the conductive layer 120A (such as the aforementioned resin matrix) and an unremoved overcoat material. The non-conductive region 136 manufactured by etching in the display region VA comprises an unremoved overcoat material. In other words, since the metal nanowires 140 are completely etched, the concentration of nanowires dispersed in the non-conductive region 136 is zero. It is noted that since the formation of the non-conductive region 136 involves slurry coating, curing, etching, and other steps, it is difficult to quantitatively analyze the composition or structure thereof. In other words, the non-conductive region 136 is comprises (or is essentially composed of) the non-conductive material of the conductive layer 120A and the overcoat that has not been removed by etching, but other residual materials, like non-conductive components such as air, a resin in metal nanowires slurry, etc. are not excluded. However, qualitatively, the resistance of the non-conductive region 136 can reach 10 times, 100 times, or more than 1000 times higher than the resistance of the conductive region and can fulfill the requirements of patterning.

In another example, the aforementioned etching liquid does not completely remove the metal nanowires 140 in the non-conductive region 136. In other words, the metal nanowires 140 remain in the non-conductive region 136, but the concentration of the remaining metal nanowires 140 is lower than a percolation threshold. The conductivity of the structural layer comprising the metal nanowires 140 may be controlled by the following factors: a) the conductivity of single metal nanowires 140; b) the number of metal nanowires 140; and c) the connectivity (also known as a contact) between the metal nanowires 140. When the concentration of the remaining metal nanowires 140 is lower than the percolation threshold, since the distance between the metal nanowires 140 is too far, the overall conductivity of the non-conductive region 136 is very low or equal to zero (or has high resistance). That is, the metal nanowires 140 do not provide a continuous current path in the structural layer and cannot form a conductive network. In other words, the metal nanowires 140 in the non-conductive region 136 form a non-conductive network. In one example, a region or a structural layer is considered to be non-conductive when the sheet resistance is higher than $10^8$ ohms/square, or higher than $10^4$ ohms/square, or higher than 3000 ohms/square, or higher than 1000 ohms/square, or higher than 350 ohms/square, or higher than 100 ohms/square. In other words, in the present example, the non-conductive region 136 manufactured by etching in the peripheral region PA comprises the non-conductive material of the conductive layer 120A (such as the resin matrix), the overcoat material, and the metal nanowires 140 with a concentration lower than the percolation threshold. Similarly, the non-conductive region 136 manufactured by etching in the display region VA comprises the overcoat material and the metal nanowires 140 with a concentration lower than the percolation threshold to achieve the isolation between the adjacent touch sensing electrodes TE. The non-conductive region 136 is not limited to the constituent materials described above. As long as the resistance of the non-conductive region 136 can qualitatively reach 10 times, 100 times, or more than 1000 times higher than the resistance of other conductive regions, the requirements for patterning are fulfilled.

Figure 4A:
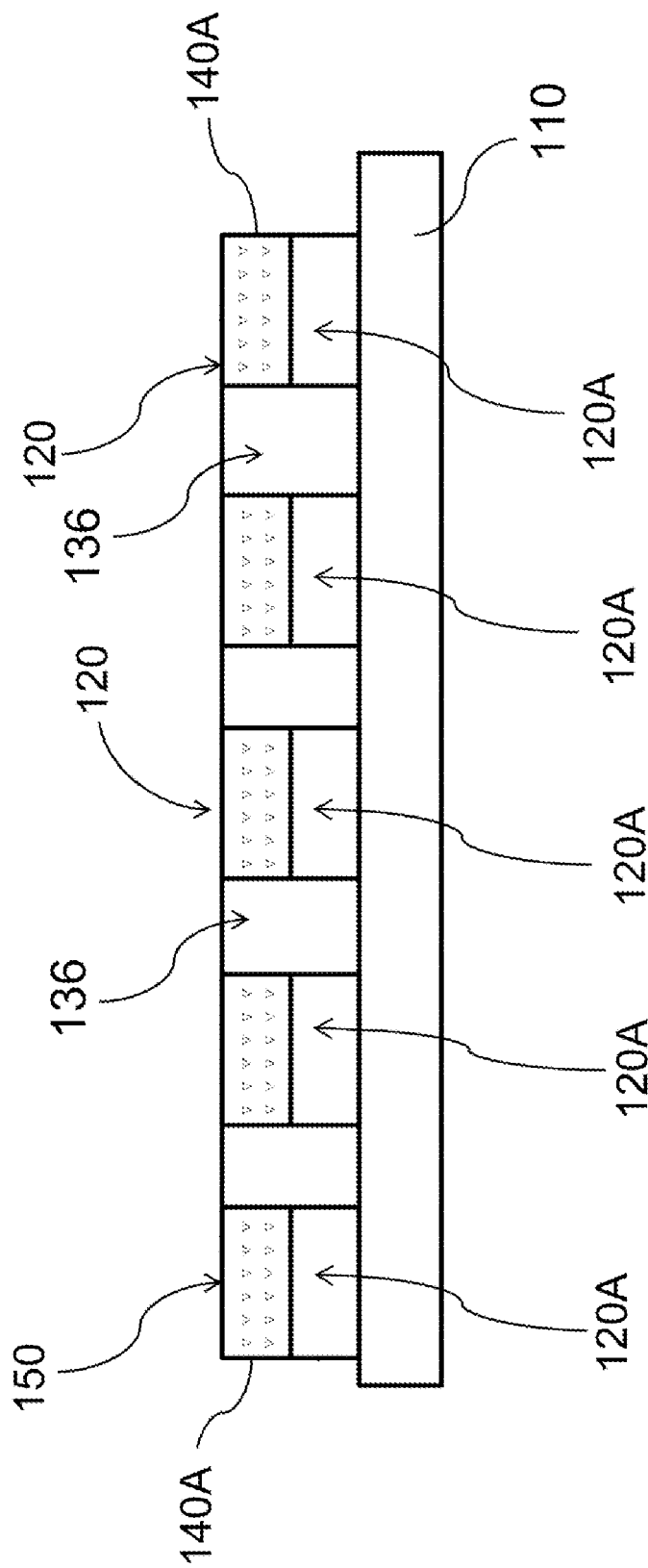
FIG. 4A and FIG. 4B are variant examples corresponding to FIG. 3A and FIG. 3B.
Figure 4B:
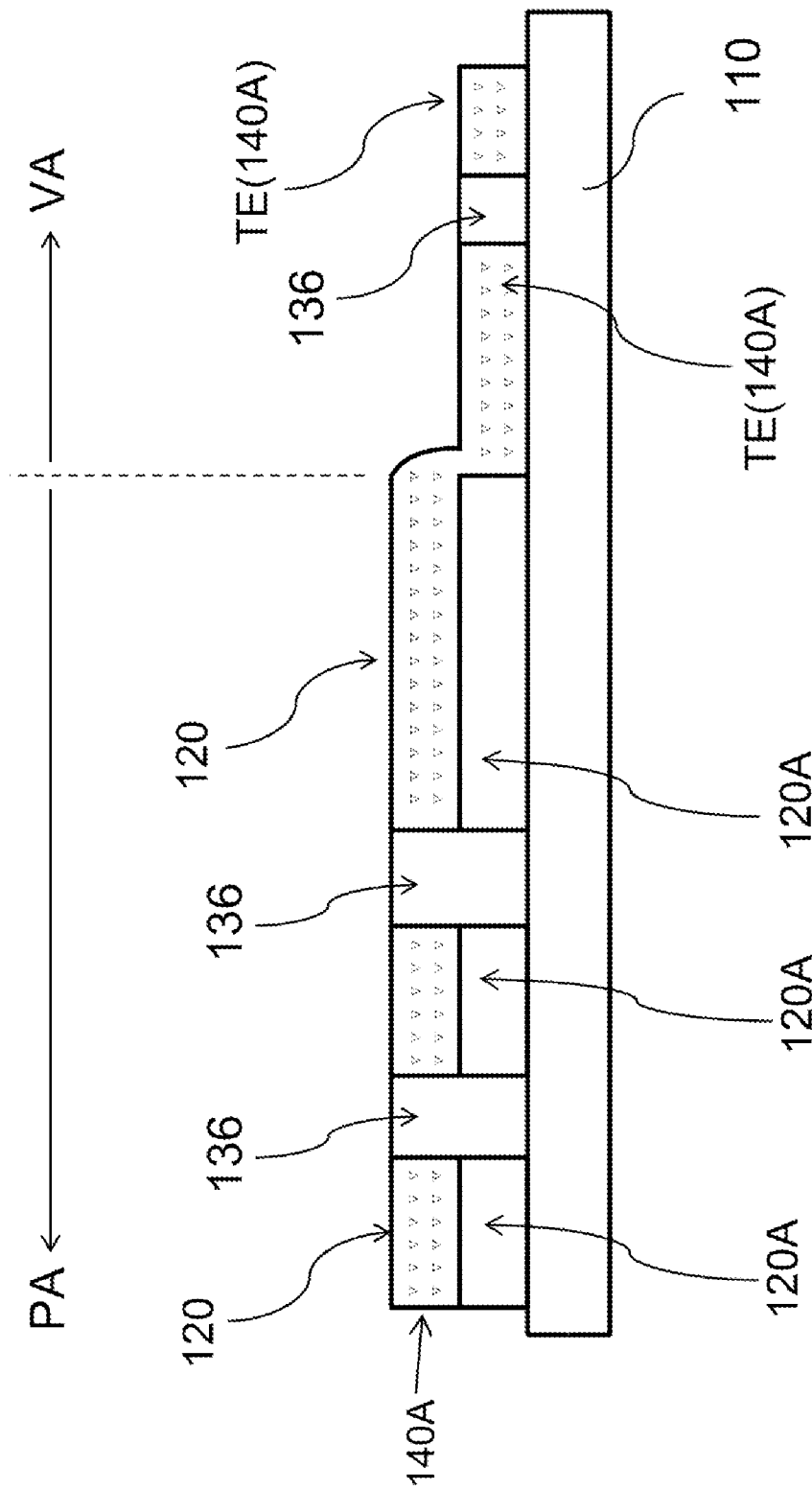

Referring to FIG. 4A and FIG. 4B, which show another example of the touch panel 100. The description of FIG. 4A and FIG. 4B correspond to those of FIG. 3A and FIG. 3B, and the difference between the present example and the previous example is at least that the conductive layer 120A is disposed between the metal nanowire layer 140A and the substrate 110. Same with the previous example, the metal nanowire layer 140A in the display region VA may be patterned to form the touch sensing electrode TE, and the conductive layer 120A and the metal nanowire layer 140A in the peripheral region PA are concurrently patterned to form the peripheral circuit 120. The non-conductive region 136 in the peripheral region PA comprises the non-conductive material of the conductive layer 120A (such as the resin matrix).

According to some embodiments of the present disclosure, a double-sided touch panel (as in FIG. 5) is proposed. The manufacturing method thereof may comprise manufacturing the metal nanowire layer 140A and the conductive layer 120A on a first surface (such as an upper surface) and a second surface (such as a lower surface) of the substrate 110 respectively. The process is similar to that described above and is not repeated herein.

Next, a patterning step is performed. The patterning step in the present example may specifically include the following steps. First, a photosensitive material (such as photoresist) is exposed/developed (such as a double-sided photolithography process) to define the pattern of the peripheral circuit 120 in the peripheral region PA. An etching liquid that can concurrently etch the metal nanowire layer 140A and the conductive layer 120A is used to perform etching (reference can be made to the composition and related description of the aforementioned etching liquid) to manufacture a first touch sensing electrode TE1 and a second touch sensing electrode TE2 comprising the metal nanowire layer 140A on the display region VA and also manufacture the peripheral circuit 120 comprising the metal nanowire layer 140A and the conductive layer 120A on the peripheral region PA. The non-conductive region 136 is between adjacent peripheral circuits 120 and comprises the non-conductive material of the conductive layer 120A (such as the aforementioned resin matrix) to electrically isolate the adjacent peripheral circuits 120 to avoid short circuit. The process is similar to that described above and is not repeated herein.

The first touch sensing electrode TE1 and the second touch sensing electrode TE2 are interlaced in structure with each other, and the first touch sensing electrode TE1 and the second touch sensing electrode TE2 can form the touch sensing electrode TE for sensing touch or controlling gestures.

Figure 5:
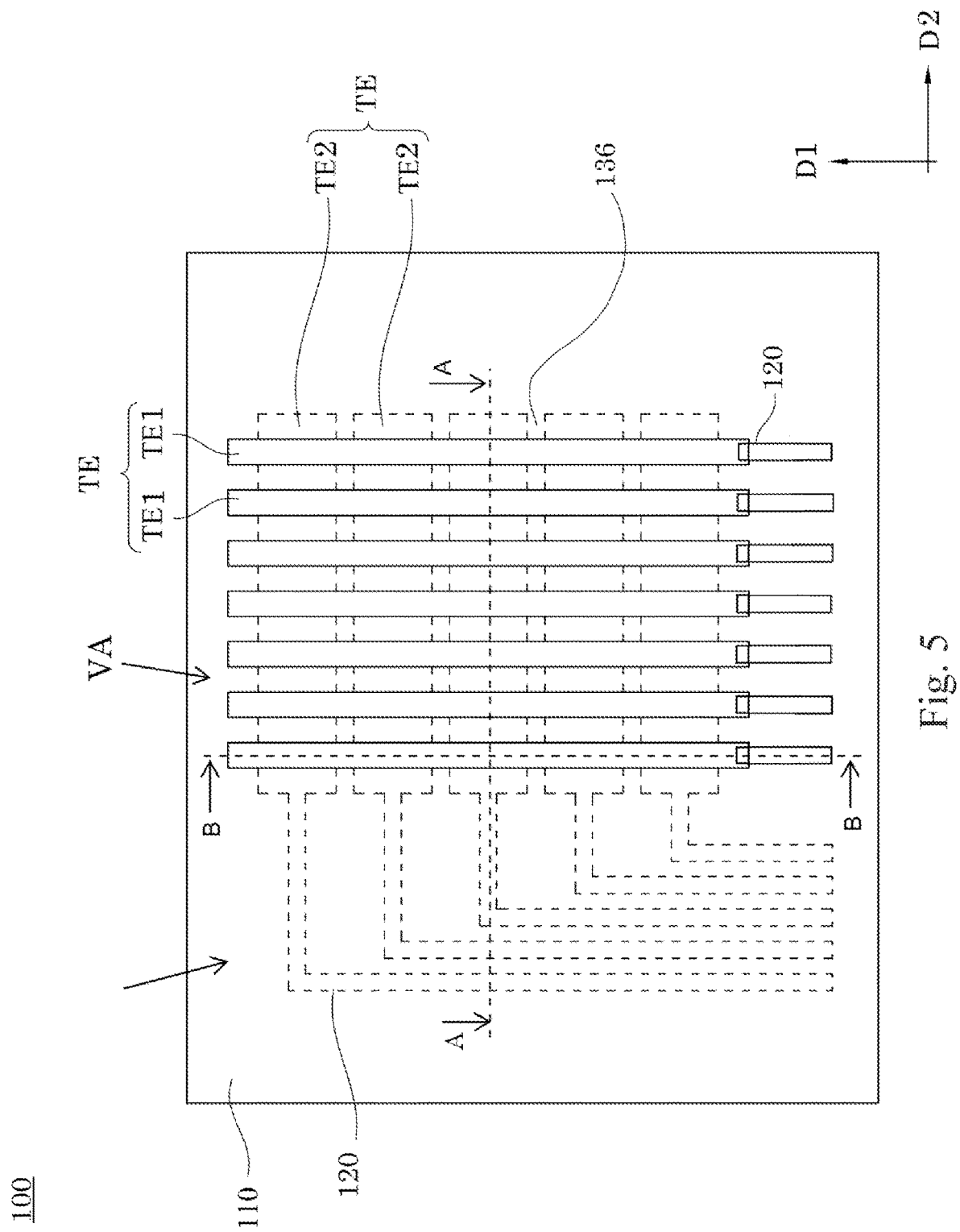
FIG. 5 is a schematic view of a touch panel according to some embodiments of the present disclosure.

As shown in FIG. 5, a touch panel 100 in the example of the present disclosure comprises a substrate 110, a touch sensing electrode TE (namely a first touch sensing electrode TE1 and a second touch sensing electrode TE2 formed of the metal nanowires 140) formed on upper and lower surfaces of the substrate 110, and a peripheral circuit 120 formed on upper and lower surfaces of the substrate 110. As shown in FIG. 5A, as viewed from the upper surface of the substrate 110, the first touch sensing electrode TE1 in the display region VA and the peripheral circuit 120 in the peripheral region PA are electrically connected to each other to transmit signals. Similarly, as shown in FIG. 5B, as viewed from the lower surface of the substrate 110, the second touch sensing electrode TE2 in the display region VA and the peripheral circuit 120 in the peripheral region PA are electrically connected to each other to transmit signals. The peripheral circuit 120 comprises the conductive layer 120A and the metal nanowire layer 140A, and there is a non-conductive region 136 comprising a non-conductive material of the conductive layer 120A (such as the resin matrix) between adjacent peripheral circuits 120 to electrically isolate the adjacent peripheral circuits 120 to avoid short circuit. The specific form of the non-conductive region 136 can be similar to that described above and is not repeated herein.

In one example, the conductive layer 120A in the double-sided structure may be disposed between the metal nanowire layer 140A and the substrate 110. Same as the example, the metal nanowire layer 140A in the display region VA may be patterned to form the first touch sensing electrode TE1 and second touch sensing electrode TE2, and the conductive layer 120A and the metal nanowire layer 140A in the peripheral region PA are concurrently patterned to form the peripheral circuit 120. The non-conductive region 136 in the peripheral region PA comprises the non-conductive material (such as the aforementioned resin matrix) of the conductive layer 120A.

According to some embodiments of the present disclosure, a double-sided touch panel is also proposed. The manufacturing method may be formed by stacking two sets of single-sided touch panels in the same direction or in opposite directions. In an example where stacking in opposite directions, the touch electrode of the first set of the single-sided touch panel is disposed facing upward (for example, nearest to the user, but not limited thereto), and the touch electrode of the second set of the single-sided touch panel is disposed facing downward (for example, farthest away from the user, but not limited thereto) and use an optical adhesive or other similar adhesives to assemble and fix the substrates of two sets of touch panels, and thereby forming the double-sided touch panel.

Preferably, the metal nanowires 140 formed in the foregoing example may be further post-processed to increase electrical conductivity of the metal nanowires 140. The post-processing may be a process step comprising, for example, heating, plasma, corona discharge, UV ozone, or pressure. For example, after the step of curing and forming the metal nanowire layer 140A, a roller may be used to apply pressure thereon. In one example, the metal nanowire layer 140A may be applied with a pressure of 50 to 3400 psi, preferably 100 to 1000 psi, 200 to 800 psi, or 300 to 500 psi, by using one or more rollers. In some examples, post-processing such as heating and pressure can be performed simultaneously. In other words, the metal nanowires 140 may be applied with pressure by using one or more rollers and is heated at the same time. For example, the pressure applied by the roller is 10 to 500 psi, preferably 40 to 100 psi, and meanwhile the roller is heated to between about 70° C. and 200° C., preferably to between about 100° C. and 175° C., such that the conductivity of the metal nanowire layer 140A can be increased. In some embodiments, the metal nanowires 140 may be preferably exposed to a reducing agent for post-treatment. For example, the metal nanowires 140 comprising the silver nanowires is preferably exposed to a silver reducing agent for post-treatment. The silver reducing agent comprises borohydrides, such as sodium borohydride; boron-nitrides, such as dimethylaminoborane (DMAB); or gas reducing agents, such as hydrogen ($H_2$). The exposure time is about 10 seconds to about 30 minutes, preferably about 1 minute to about 10 minutes. The step of applying pressure can be implemented in appropriate steps according to actual needs.

The touch panel of the example in the present disclosure may be assembled with other electronic devices, such as a display with a touch-control function. For example, the substrate 110 may be attached to a display component, such as a liquid crystal display component or an organic light-emitting diode (OLED) display component, and the substrate 110 and the display component can be laminated with an optical adhesive or other similar adhesives. The touch sensing electrode TE can also be laminated by using an optical adhesive and an outer cover layer (such as protective glass). The touch panel of the present disclosure can be applied on electronic devices such as portable phones, tablet computers, laptop computers, etc.

The structure, materials, and manufacturing processes of the different examples of the present disclosure can reference each other and are not limited to the foregoing specific embodiments.

In some embodiments of the present disclosure, the conductive layer in the peripheral region may in direct contact with the metal nanowire layer to form the peripheral circuit. Therefore, as a whole, the metal nanowires in the metal nanowire layer and the peripheral circuit will form a direct-contact and low-impedance signal transmission path, which is used to transmit the control signal and touch-sensing signal between the touch sensing electrode and an external controller. Moreover, due to the low impedance characteristic, the loss of signal transmission is reduced, thereby solving the problem of excessively high contact impedance in traditional structures.

In some embodiments of the present disclosure, after etching, the non-conductive material (such as organic resins, etc.) may remain in the etched region, thereby obtaining advantages of smaller resolution and mass production. The present disclosure can avoid the use of laser technology to reduce process time (the processing time is reduced by about 25%-35%) and greatly increase production efficiency.

In some embodiments of the present disclosure, the composite structural layer of the peripheral circuit can be formed in a single etching process, and the application in the manufacturing of touch panel can simplify the patterning process of the peripheral circuit, thus having the advantages of simple process, rapid manufacturing, and low manufacturing cost.

In some embodiments of the present disclosure, the composite structure layer of the peripheral circuit can be formed in a single etching process, so the number of alignments required in the process can be reduced, thereby avoiding errors in the alignment step to improve process yield.

In some embodiments of the present disclosure, the composite structure layer of the peripheral circuit can be formed in a single etching process, such that the alignment tolerance that is reserved for an alignment process can be omitted, and the width of the peripheral region is effectively reduced.

In some embodiments of the present disclosure, the foregoing process can be combined with roll-to-roll production technology for continuous, large batch production of single-sided/double-sided electrode structure touch panels.

Although the present disclosure has been disclosed in various embodiments as above, it is not used to limit the present invention. It will be apparent to those skilled in the art that various modifications and variations can be made to the structure of the present invention without departing from the scope or spirit of the invention.

What is claimed is:

1. A touch panel, comprising:
a substrate having a display region and a peripheral region;
a touch sensing electrode disposed in the display region of the substrate; and
a peripheral circuit disposed in the peripheral region of the substrate, the touch sensing electrode being electrically connected to the peripheral circuit,
wherein, the touch sensing electrode comprises a first portion of a metal nanowire layer that is patterned, the peripheral circuit comprises a conductive layer and a second portion of the metal nanowire layer that are patterned, the conductive layer comprises conductive filler particles and a non-conductive material in which the conductive filler particles are embedded, the second portion of the metal nanowire layer and a combination of the conductive filler particles and the non-conductive material overlap in a direction perpendicular to a top surface of the substrate, and the non-conductive material in the conductive layer is further between the peripheral circuit and a second peripheral circuit.

2. The touch panel of claim 1, further comprising an overcoat disposed on the metal nanowire layer.

3. The touch panel of claim 2, wherein a non-conductive region is between the peripheral circuit and the second peripheral circuit, and the non-conductive material in the conductive layer and the overcoat are disposed in the non-conductive region.

4. The touch panel of claim 2, wherein a non-conductive region is between the touch sensing electrode and a second touch sensing electrode, and the overcoat is disposed in the non-conductive region.

5. The touch panel of claim 1, wherein the conductive layer is formed by curing a conductive slurry comprising the conductive filler particles and the non-conductive material.

6. The touch panel of claim 1, wherein, with respect to the peripheral circuit, the second portion of the metal nanowire layer is between the conductive layer and the substrate, or the conductive layer is between the second portion of the metal nanowire layer and the substrate.

7. The touch panel of claim 1, wherein the touch sensing electrode comprises a first touch sensing electrode disposed at an upper surface of the substrate and a second touch sensing electrode disposed at a lower surface of the substrate.

8. A method of manufacturing a touch panel, comprising:
providing a substrate having a display region and a peripheral region;
disposing a metal nanowire layer comprising metal nanowires and disposing a conductive layer on the substrate, a first portion of the metal nanowire layer being disposed in the display region, a second portion of the metal nanowire layer being disposed in the peripheral region, and the conductive layer being disposed in the peripheral region and comprising conductive filler particles and a non-conductive material in which the conductive filler particles are embedded, the second portion of the metal nanowire layer and a combination of the conductive filler particles and the non-conductive material overlapping in a direction perpendicular to a top surface of the substrate; and
performing a patterning step, comprising patterning the first portion of the metal nanowire layer disposed in the display region to form a touch sensing electrode and concurrently patterning the conductive layer and the second portion of the metal nanowire layer disposed in the peripheral region to form a peripheral circuit, wherein at least the non-conductive material of the conductive layer that is not removed during the patterning step is further between the peripheral circuit and a second peripheral circuit.

9. The method of claim 8 for manufacturing a touch panel, wherein disposing the conductive layer on the substrate comprises coating a conductive slurry comprising the conductive filler particles and the non-conductive material on the substrate and then curing.

10. The method of claim 8 for manufacturing a touch panel, wherein performing the patterning step comprises concurrently applying an etching liquid on the conductive layer and the metal nanowire layer, wherein an etching rate ratio of the etching liquid for the conductive filler particles to the non-conductive material is at least 10.

11. The method of claim 10 for manufacturing a touch panel, wherein the etching liquid comprises 0.01 wt % to 80 wt % of a metal etchant and 20 wt % to 99.9 wt % of a solvent.

12. The method of claim 11 for manufacturing a touch panel, wherein the metal etchant comprises:
hypochlorous acid, permanganic acid, perchloric acid, dichromic acid, salts of at least one of the hypochlorous acid, the permanganic acid, or the dichromic acid, or a combination thereof;
metal-containing salts; and
peroxides, a mixture of peroxides and acids, or a mixture of peroxides and chelating agents.

13. The method of claim 11 for manufacturing a touch panel, wherein the etching liquid further comprises 0.1 wt % to 20 wt % of an additive.

14. The method of claim 8 for manufacturing a touch panel, wherein disposing the metal nanowire layer comprising the metal nanowires and disposing the conductive layer on the substrate comprises:
disposing the metal nanowire layer on the substrate;
disposing the conductive layer on the metal nanowire layer; and
removing the conductive layer on the display region.

15. The method of claim 8 for manufacturing a touch panel, wherein disposing the metal nanowire layer comprising the metal nanowires and disposing the conductive layer on the substrate comprises:

disposing the metal nanowire layer on the substrate;

coating a conductive slurry comprising the conductive filler particles and the non-conductive material on the metal nanowire layer in the peripheral region; and curing the conductive slurry to form the conductive layer.

16. The method of claim 8 for manufacturing a touch panel, wherein disposing the metal nanowire layer comprising the metal nanowires and disposing the conductive layer on the substrate comprises:

coating a conductive slurry comprising the conductive filler particles and the non-conductive material on the substrate in the peripheral region;

curing the conductive slurry to form the conductive layer; and disposing the metal nanowire layer on the conductive layer and the substrate.

17. The method of claim 8 for manufacturing touch panel, further comprising disposing an overcoat on the metal nanowire layer.

18. The method of claim 17 for manufacturing touch panel, wherein a non-conductive region is between the peripheral circuit and the second peripheral circuit, and the non-conductive material in the conductive layer and the overcoat disposed in the non-conductive region are not removed during the patterning step.

19. The method of claim 17 for manufacturing touch panel, wherein a non-conductive region is between the touch sensing electrode and a second touch sensing electrode, and the overcoat disposed in the non-conductive region is not removed during the patterning step.

20. A touch panel, comprising:

a substrate having a display region and a peripheral region;

a touch sensing electrode disposed in the display region of the substrate; and a peripheral circuit disposed in the peripheral region of the substrate, the touch sensing electrode being electrically connected to the peripheral circuit, wherein, the touch sensing electrode comprises a first portion of a metal nanowire layer that is patterned, the peripheral circuit comprises a conductive layer and a second portion of the metal nanowire layer that are patterned, the conductive layer comprises conductive filler particles and a non-conductive material in which the conductive filler particles are embedded, and the non-conductive material in the conductive layer is further between the peripheral circuit and a second peripheral circuit.

* * * * *